United States Patent [19]

Schooler et al.

[11] Patent Number: 6,115,727

[45] Date of Patent: Sep. 5, 2000

[54] TIME-WEIGHTED TRIMMED-MEAN FILTERING APPARATUS AND METHOD

[75] Inventors: Anthony Schooler, Bartlett; David Kang, Schaumburg; W. John Rinderknecht, Streamwood, all of Ill.

[73] Assignee: Motorola, Inc., Schaumburg, Ill.

[21] Appl. No.: 08/961,480

[22] Filed: Oct. 31, 1997

[51] Int. Cl.[7] ............................... G06F 7/00; G06F 17/10
[52] U.S. Cl. ........................................... 708/304; 708/202
[58] Field of Search ..................... 364/715.013, 724.014, 364/734, 715.06; 708/200, 202, 207, 304, 445; 701/101, 110, 111

[56] References Cited

U.S. PATENT DOCUMENTS

| | | | |
|---|---|---|---|
| 4,597,009 | 6/1986 | Ballmer et al. ........................ | 348/571 |
| 5,044,194 | 9/1991 | James et al. ........................... | 73/112 |
| 5,144,568 | 9/1992 | Glover ............................. | 364/715.013 |
| 5,426,785 | 6/1995 | Coffield ............................. | 395/800.17 |
| 5,708,595 | 1/1998 | Connell ............................ | 364/715.1 |

*Primary Examiner*—Chuong Dinh Ngo
*Attorney, Agent, or Firm*—Gary J. Cunningham

[57] ABSTRACT

An apparatus and method of filtering at least one set of data comprises determining a subset of Q data elements of a set of L data elements (12), and determining a filtered value based upon the subset of Q data elements (14). Each of the subset of Q data elements is greater than at most a first predetermined number of the L data elements and greater than or equal to at least a second predetermined number of the L data elements other than itself.

34 Claims, 5 Drawing Sheets

FIG. 5

TIME-WEIGHTED TRIMMED-MEAN FILTERING APPARATUS AND METHOD

RELATED APPLICATION

The present application is related to the following application:

"MODIFIED TRIMMED MEAN FILTERING FOR MISFIRE DETECTION", having Ser. No. 08/690,464, filed Jul. 29, 1996 now U.S. Pat. No. 5,862,506.

The subject matter of the above-identified related application is hereby incorporated by reference into the disclosure of this application.

FIELD OF THE INVENTION

The present invention relates to filtering apparatus and methods, in particular to trimmed-mean-median filtering.

BACKGROUND OF THE INVENTION

Median filtering is used to remove unwanted data from a signal. In an automotive application, a median filter can be used to remove low frequency extraneous engine and driveline vibrations from an acceleration signal used to predict combustion misfiring. An example of a system using median filtering in a misfire detection system is disclosed in U.S. Pat. No. 5,515,720 to Remboski et al. The median of a moving window of acceleration data is subtracted from the acceleration data to provide a nonlinear, high-pass filtering of the acceleration data.

Although prior art median filters are effective in removing unwanted signals, prior art approaches are very resource intensive. This makes these schemes not only silicon-complex and expensive, but difficult to manufacture and less reliable than desired.

What is needed is a simpler approach to median filtering that is less silicon-complex, easier manufacture and more reliable.

DETAILED DESCRIPTION OF A PREFERRED EMBODIMENT

Embodiments of the present invention provide a filtering apparatus and method that can be used in a variety of applications. Of particular interest is an application to remove low frequency driveline induced ringing noise from an acceleration signal used to predict combustion misfiring in an internal combustion engine.

Figure 1:
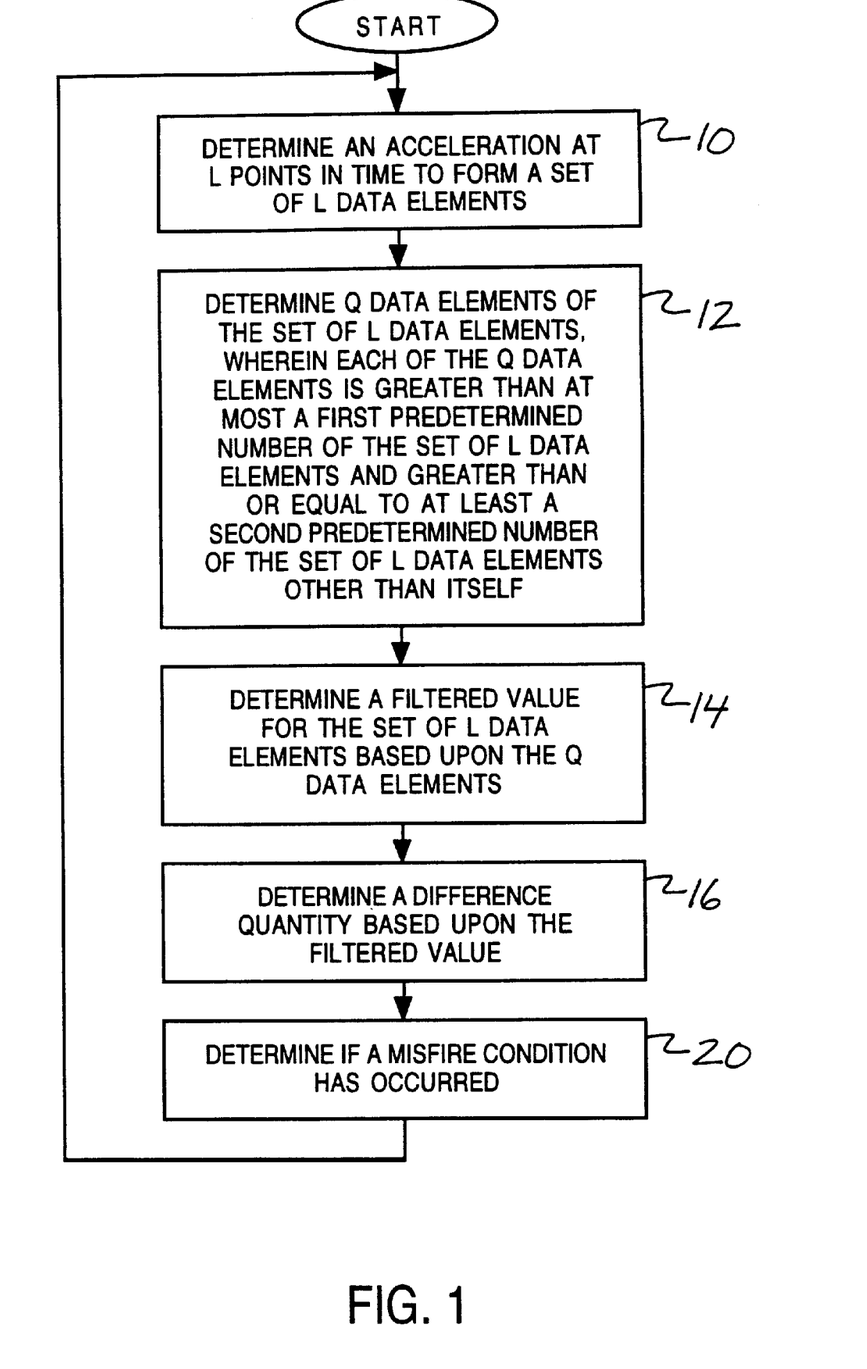
FIG. 1 is a flow chart of an embodiment of a method to filter at least one set of data.

FIG. 1 is a flow chart of a method embodiment to filter at least one set of data. As indicated by block 10, the method includes a step of forming a set of L data elements. Note that the term L is representative of a number of data elements in a set being operated on, which represents a rank of the filter.

Preferably, but optionally, the L data elements represent acceleration data formed by determining an acceleration at L points in time. Although not necessary, it is preferred that the L data elements be time-ordered. It is also preferred that the L data elements be associated with a sensed operating characteristic of a vehicle such as an acceleration measurement from a vehicle, such as engine crankshaft acceleration.

As indicated by block 12, the method includes a step of determining a subset of Q data elements of a first set of L data elements. Note that the term Q is representative of a number of a subset of data elements in the set of L data elements being operated on. Since the present example concerns a first set of data we will refer to the Q data elements as the Q1 data elements and the L data elements as the L1 data elements. The subset of Q1 data elements satisfy criteria that each data element is greater than at most a first predetermined number of the first set of L1 data elements and greater than or equal to at least a second predetermined number of the first set of L data elements other than itself. This means that the data element being operated on does not get compared against itself. Preferably, the first predetermined number is equal to $(L1+Q1-2)/2$, and the second predetermined number is equal to $(L1-Q1)/2$.

The step of determining the subset of Q1 data elements can be performed in many ways. Preferably, this step includes steps of, for each of the L1 data elements: (i) determining a first number C1 of the first set of L1 data elements which are less than the data element; and (ii) determining a second number C2 of the first set of L1 data elements, other than the data element, which are less than or equal to the data element. Preferably, the first number C1 is determined using a first counter, and the second number C2 is determined using a second counter.

The data element is included in the subset of Q1 data elements by determining that the first number C1 is less than a first threshold, and by determining that the second number C2 is greater than or equal to a second threshold. Preferably, the first threshold is $(L1+Q1)/2$ and the second threshold is $(L1-Q1)/2$.

Each of the subset of Q1 data elements can be determined in this manner. For example, if the subset of Q1 data elements include a second data element, the step of determining the subset of Q1 data elements comprises: determining, using the first counter, a third number of the first set of L1 data elements which are less than the second data element; and determining, using the second counter, a fourth number of the first set of L1 data elements, other than the second data element, which are less than or equal to the second data element.

As indicated by block 14, the method includes a step of determining a first filtered value for the first set of L1 data elements based upon the subset of Q1 data elements. Preferably, the step of determining the first filtered value comprises steps of summing the subset of Q1 data elements to form a sum and dividing the sum by Q1. It is also preferred that the each of the subset of Q1 data elements be added to an accumulator upon determining its consistency with the criteria described with reference to block 12.

As indicated by block 16, the method preferably, but optionally, further comprises a step of determining a difference quantity based upon the first filtered value. More preferably, the difference quantity is a difference between a time-centered value of the L1 data elements and the first filtered value where the L1 data elements are time-ordered. Alternative, the difference quantity can be a difference between any one of the L1 data elements, or any function of the L1 data elements, and the first filtered value.

As indicated by block 20, the method optionally, but preferably, further comprises a step of detecting if a misfire condition has occurred based upon the first filtered value. More preferably, the misfire condition is detected based upon the difference quantity determined in block 16.

Thereafter, flow of the method returns to block 10 to repeat the aforementioned steps one or more times. For purposes of illustration and example, flow of the method is described for a second set of data elements formed in block 10. Since the present example concerns a second set of data we will refer to the present subset of Q data elements as the subset of Q2 data elements and the present L data elements as the L2 data elements. It is noted that the number of data elements referred to by L2 can be the same as the number of data elements referred to by L1 or can differ from the number of data elements referred to by L1. Said another way, a number of members in the L2 set of data elements is different than a number of members in the L1 set of data elements. Correspondingly, a number of members in a subset of Q2 data elements is different than a number of members in the subset of Q1 of data elements.

In block 12, a step of determining subset of Q2 data elements of the second set of L2 data elements is performed. The subset of Q2 data elements satisfy the criteria that each data element is greater than at most a third predetermined number of the second set of L2 data elements and greater than or equal to at least a fourth predetermined number of the second set of L2 data elements other than itself. Preferably, the third predetermined number is equal to $(L2+Q2-2)/2$, and the fourth predetermined number is equal to $(L2-Q2)/2$. It is noted that Q2 can be the same as Q1 or can differ from Q1. Typically, both Q1 and Q2 are greater than one (e.g. two or more).

With reference to blocks 14 and 16, steps of determining a second filtered value for the second set of L2 data elements based upon the subset of Q2 data elements, and determining a second difference quantity based upon the second filtered value can be performed. With reference to block 20, a step of detecting if a misfire condition has occurred is performed based upon the second filtered value and/or the second difference quantity.

Figure 2:
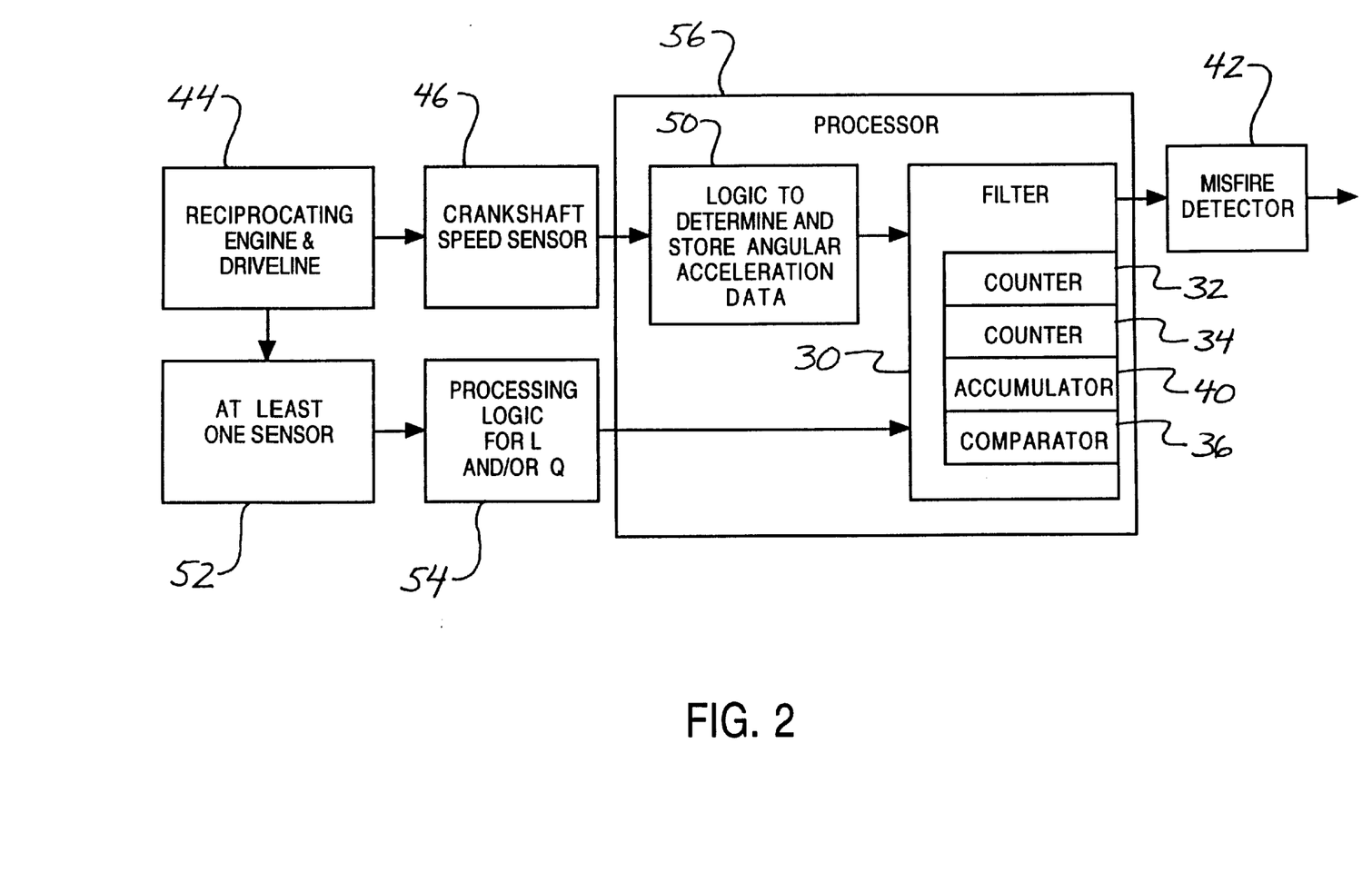
FIG. 2 is a block diagram of an embodiment of an apparatus to perform the steps described with reference to FIG. 1.

FIG. 2 is a block diagram of an embodiment of an apparatus to perform the steps described with reference to FIG. 1. The apparatus comprises a filter 30 to filter at least one set of data. In particular, the filter 30 determines a subset of Q data elements from each set of L data elements provided thereto. As stated herein, Q and L can differ for different sets data elements. Based upon the subset of Q data elements, the filter 30 determines a filtered value for the set of L data elements.

As stated herein, each of the subset of Q data elements satisfy the criteria of being greater than at most a first predetermined number of the first set of L data elements and greater than or equal to at least a second predetermined number of the first set of L data elements other than itself. Preferably, the first predetermined number is $(L+Q-2)/2$ and the second predetermined number is $(L-Q)/2$.

The filter 30 includes a first counter 32, a second counter 34, and a comparator 36 to assist in determining if a data element satisfies the above-described criteria. Preferably, the first counter 32 is employed to count or otherwise determine how many of the set of L data elements are less than the data element (which is referred to as the number C1). The second counter 34 is employed to count or otherwise determine how many of the set of L data elements, other than the data element, are less than or equal to the data element (which is referred to as the number C2). The comparator 36 is used to perform less-than comparisons and less-than-or-equal-to comparisons.

If a data element satisfies the criteria, its value is added to an accumulator 40. The accumulator 40 is used for summing the subset of Q data elements. After determining the subset of Q data elements, the filter 30 divides the sum stored by the accumulator 40 by Q to form the filtered value. Preferably, Q is an integral power of two (such as two, four, eight, sixteen, etc.), namely $2^n$ where n is an integer. In this case, the division can be performed by shifting the accumulator 40 by n bits to the right.

Optionally and preferably, the filter 30 determines a difference quantity based upon the filtered value. The difference quantity can be a difference between a time-centered value of the L data elements and the filtered value to provide a high-pass filtering function.

Optionally, the apparatus further comprises a misfire detector 42 responsive to the filter 30. The misfire detector 42 determines whether or not a misfire condition has occurred based upon at least one of the filtered value and the difference quantity. Preferably, the misfire detector 42 detects a misfire condition when the difference quantity is beyond a predetermined threshold. For example, the misfire condition can be detected when the difference quantity attains or exceeds the predetermined threshold.

In a preferred application of the filter 30, each set of L data elements is based upon an operating characteristic of a reciprocating engine and driveline induced 44 of a vehicle. A sensor 46, such as a crankshaft speed sensor, assists in determining the set of L data elements. Preferably, the sensor 46 senses an angular speed of a crankshaft at various points in time, and generates signals representative of speed data. Based upon the speed data, processing logic 50 determines and stores time-ordered angular acceleration data for L points in time (thus providing the set of L data elements). Preferably, the L data elements are stored in a memory such as a queue. The filter 30 is responsive to the sensor 46 and the processing logic 50.

At least one sensor 52 assists in determining the Q parameter and/or the L parameter used by the filter 30. The at least one sensor 52 senses at least one operating characteristic associated with the reciprocating engine and driveline induced 44. The at least one sensor 52 an be used to perform an engine speed measurement, an engine load measurement, a transmission gear measurement, and/or an engine-to-transmission coupling, compliance measurement. Signals representative of each measurement are applied to processing logic 54.

The processing logic 54 determines Q and/or L based upon the measurements applied thereto. Preferably, the value of L is varied to reduce or eliminate a monotonic trend in the data. In this case, the value of L can be based upon engine speed and engine load. Such a monotonic trend can occur, for example, in response to a driver-initiated throttle input for the engine. The value of L can be determined by a look-up table based upon th e measurements applied thereto.

The value of Q can b e varied based upon an irregularity of positional markers disposed on a wheel coupled to the crankshaft. The positional markers are sensed by the crankshaft speed sensor 46 to sense the angular speed of the crankshaft. The wheel can have, for example, positional markers in the form of teeth. For teeth having imprecise and varying edges, the value of Q is set larger than for more precise teeth. In this way, Q can vary from vehicle to vehicle. The value of Q can be determined by a look-up table based upon the measurements applied thereto.

As described herein, the Q parameter defines how many data elements are averaged to form a filtered value. The Q parameter controls the low-pass filtering of the filter 30. The low-pass filtering is advantageous in attenuating or removing high frequency components, such as high frequency noise, in the data.

The processing logic 54 communicates a signal representative of Q and/or a signal representative of L to the filter 30. In this way, the values of Q and/or L can be varied for different sets of data elements.

In summary, the filter 30 operates as a high-order, high-pass filter to filter out (e.g. attenuates or removes) low frequency driveline induced behavior, and as a low pass filter to attenuate or remove extraneous high frequency data.

Preferably, the filter 30 and the processing logic 50 are included in a processor 56. In general, the processor 56 can have either an analog implementation or a digital implementation. The processor 56 can have the form of a custom integrated circuit, an application specific integrated circuit, or a general purpose microprocessor programmed to perform a series of programmed steps. Optionally, the steps performed by the processor 56 are directed by machine-readable data stored by a machine-readable storage medium, such as an optical storage medium, an electronic storage medium or a magnetic storage medium. Using the custom integrated circuit approach yields a very silicon-efficient solution. This silicon-efficient solution meets the goals setup in the background section of this application, that of a simpler approach to median filtering that is less silicon-complex, easier manufacture and more reliable.

The processing logic 54 and the misfire detector 42 can be included in integrated circuits external to an integrated circuit for the processor 56. Alternatively, either or both of the processing logic 54 and the misfire detector 42 can be included with the same integrated circuit as the processor 56.

Figure 3:
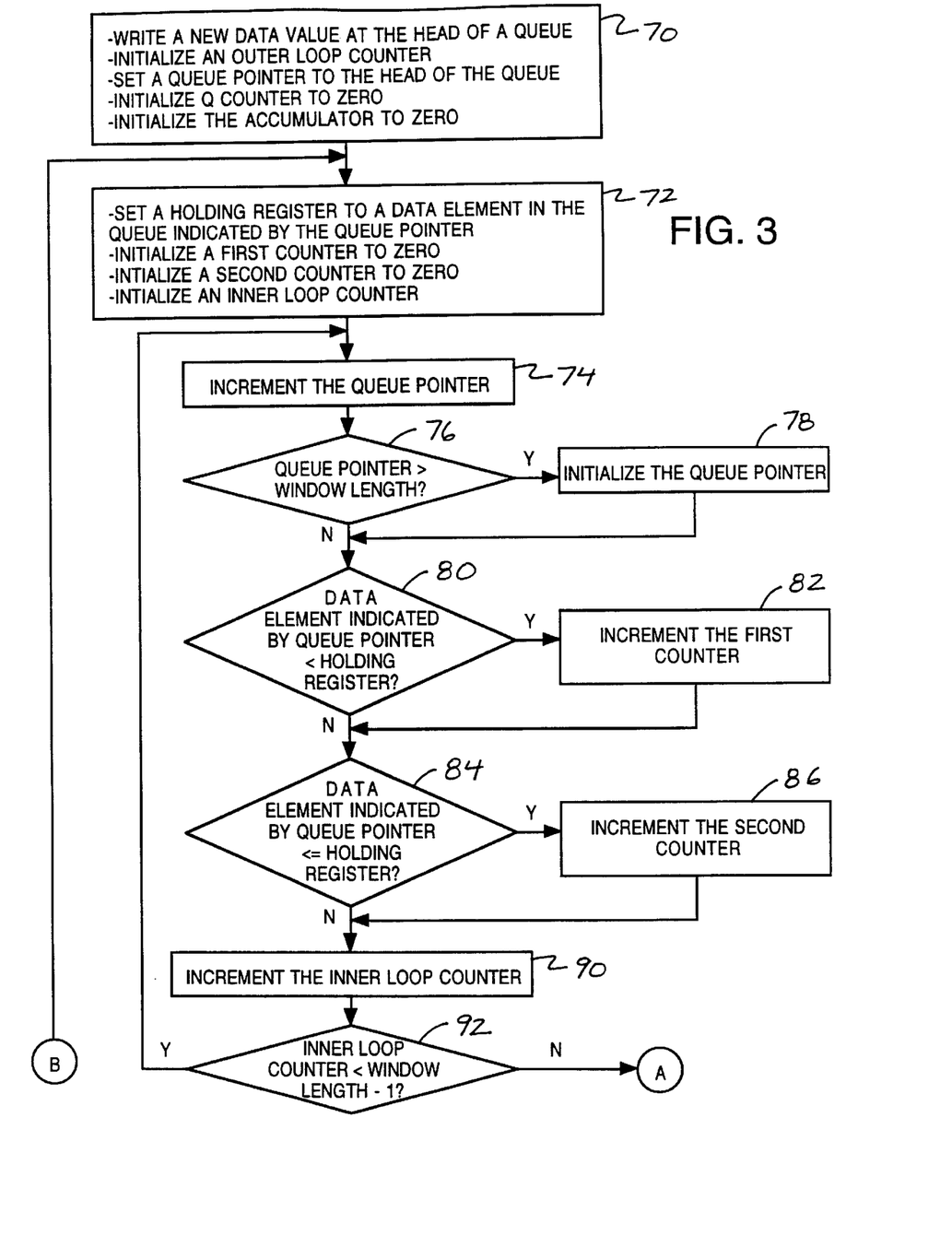
FIGS. 3 and 4 show a flow chart of a preferred embodiment of a method to filter at least one set of data elements.
Figure 4:
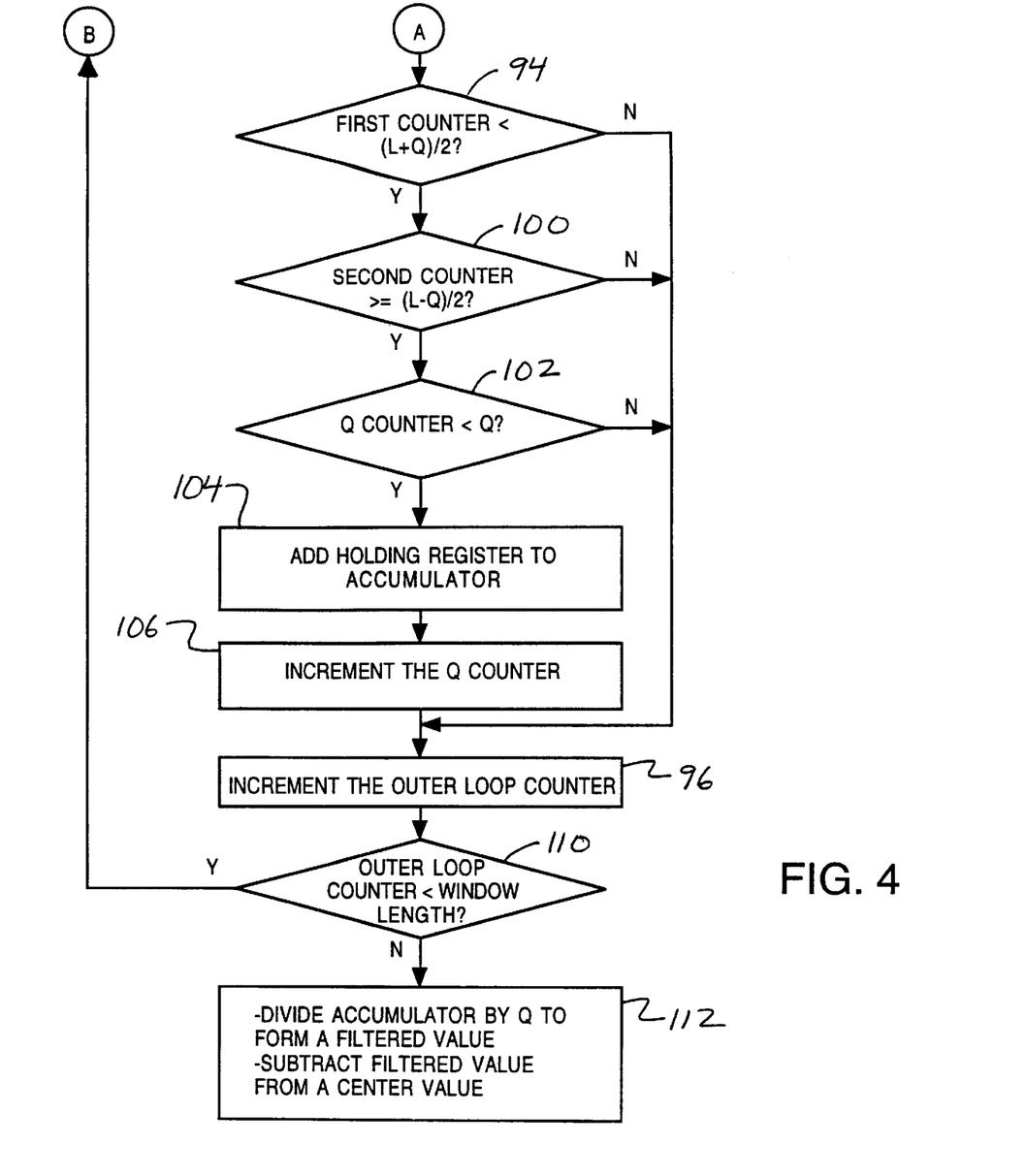

FIGS. 3 and 4 show a flow chart of a preferred embodiment of a method to filter at least one set of data elements. Preferably, the method is performed using the apparatus described with reference to FIG. 2, although an alternative apparatus can be used.

As indicated by block 70, the method includes one or more initialization steps. These steps include writing a new data value at the head of a queue having the L data elements, initializing an outer loop counter to one, setting a queue pointer to the head of the queue, initializing a data element counter to zero, and initializing the accumulator to zero.

As indicated by block 72, the method includes outer loop initialization steps. These steps include setting a holding register equal to a data element in the queue to which the queue pointer points, initializing a first counter to zero, initializing a second counter to zero, and initializing an inner loop counter to one.

As indicated by block 74, the method includes an inner loop initialization step. This step includes incrementing the queue pointer to point to an adjacent data element in the queue.

As indicated by block 76, a step of comparing the queue pointer to the window length L is performed. If the queue pointer is greater than L, then a step of initializing the queue pointer to one (i.e. to the head of the queue) is performed as indicated by block 78.

As indicated by block 80, the method includes a step of comparing the data element indicated by the queue pointer to the value in the holding register. If the data element indicated by the queue pointer is less than the value in the holding register, then a step of incrementing the first counter is performed as indicated by block 82.

As indicated by block 84, the method includes a step of comparing the data element indicated by the queue pointer to the value in the holding register. If the data element indicated by the queue pointer is less than or equal to the value in the holding register, then a step of incrementing the second counter is performed as indicated by block 86.

As indicated by block 90, a step of incrementing the inner loop counter is performed. As indicated by block 92, a step of comparing the inner loop counter to one less than the window length (i.e. L−1) is performed. If the inner loop counter is less than L−1, then flow of the method is directed back to block 74. Otherwise, flow of the method is directed to block 94.

Block 94 indicates a step of comparing the first counter to a threshold of (L+Q)/2. If the first counter is greater than or equal to (L+Q)/2, then flow of the method is directed to block 96.

If the first counter is less than (L+Q)/2, then a step of comparing the second counter to a threshold of (L−Q)/2 is performed as indicated by block 100. If the second counter is less than (L−Q)/2, then flow of the method is directed to block 96.

If the second counter is greater than or equal to (L−Q)/2, then a step of comparing the Q counter to Q is performed as indicated by block 102. If the Q counter is equal to Q, then flow of the method is directed to block 94. If the Q counter is less than Q, then steps of adding the holding register value to the accumulator (block 104) and incrementing the Q counter (block 106) are performed.

Block 96 indicates a step of incrementing the outer loop counter. A step of comparing the outer loop counter to a threshold, such as the window length L, is performed in block 110. If the outer loop counter is less than L, then flow of the method is directed back to block 72. Otherwise, flow of the method is directed to block 112 wherein the accumulator value is divided by Q to form a filtered value, and wherein the filtered value is subtracted from a center value of the queue to form a difference quantity.

TABLE I shows an example of quantities generated in the method described with reference to FIGS. 3 and 4. The method is applied to a window of eight queue data values (hence L=8 in this example). It is explicitly noted that the queue data values are presented for purposes of illustration and example, and may not be representative of actual data values generated in a vehicle, for example. For purposes of illustration and example, the value of Q is selected to be two.

TABLE I

| Queue Location | Queue Data | Final value of first counter | First counter <(L + Q)/2? | Final value of second counter | Second counter >= (L − Q)/2? |
| --- | --- | --- | --- | --- | --- |
| 0 | 0 | 0 | Yes | 0 | No |
| 1 | 2 | 1 | Yes | 3 | Yes |
| 2 | 2 | 1 | Yes | 3 | Yes |
| 3 | 2 | 1 | Yes | 3 | Yes |
| 4 | 4 | 4 | Yes | 4 | Yes |
| 5 | 5 | 5 | No | 5 | Yes |
| 6 | 6 | 6 | No | 6 | Yes |
| 7 | 7 | 7 | No | 7 | Yes |

The queue is sequenced starting at the head, i.e. at queue location 0. The queue data at this location is loaded into the holding register. The value of the holding register is compared to the queue data at each of queue locations 1 to 7. The final value of the first counter (indicating the number of queue locations having data less than the holding register) is 0 for queue location 0. The final value of the second counter (indicating the number of queue locations, other than queue location 0, having data less than or equal to the holding register) is also 0 for queue location 0.

The value of the first counter is determined to be less than (L+Q)/2 (which is equal to 5 in this example). The value of the second counter is determined to be not greater than or equal to (L−Q)/2 (which is equal to 3 in this example). Hence, the data element for queue location 0 does not satisfy the criteria for being included in the subset of Q data elements.

The queue pointer is incremented to queue location 1. The queue data at this location is loaded into the holding register. The value of the holding register is compared to the queue data at each of queue locations 2 to 7, and then queue location 0. The final value of the first counter (indicating the number of queue locations having data less than the holding register) is 1 for queue location 1. The final value of the second counter (indicating the number of queue locations, other than queue location 1, having data less than or equal to the holding register) is 3 for queue location 1.

The value of the first counter is determined to be less than (L+Q)/2 (which is equal to 5 in this example). The value of the second counter is determined to be greater than or equal to (L−Q)/2 (which is equal to 3 in this example). Hence, the data element for queue location 1 satisfies the criteria for being included in the subset of Q data elements. Accordingly, the data value 2 associated with queue location 1 is added to the accumulator.

Thereafter, the method can be performed for each of queue locations 2 to 7. As shown in Table 1, four data elements, corresponding to queue locations 1 to 4, satisfy the criteria. However, only two of the data elements, corresponding to queue locations 1 and 2, are used to form the filtered value. The filtered value is equal to the sum of the data elements at queue locations 1 and 2, divided by 2 (which is (2+2)/2=2).

In general, more than Q data elements may satisfy the aforementioned criteria. In these cases, only Q of the data elements which satisfy the criteria are used to form the filtered value. Using the method described with reference to FIGS. 3 and 4, the first Q data elements which satisfy the criteria are used to form the filtered value.

It is noted that various equivalent embodiments of the present invention can be devised. For example, the second counter can be used to count the number of data elements equal to the holding register (rather than less than or equal to the holding register). In this case, the sum of the first counter and the second counter can be compared to the threshold of (L−Q)/2 in block 100.

As another example, the second counter can be used to count the number of data elements greater than the holding register. In this case, the second counter can be compared to the threshold of (L+Q)/2 in block 100. If the second counter is less than (L+Q)/2, flow of the method is directed to block 102.

Thus, there has been described herein several embodiments including preferred embodiments of a filtering method, apparatus, and article of manufacture.

Advantageously, embodiments of the present invention provide a filter responsive to a parameter Q which can be preset and/or varied to improve the performance of the filter for a fixed window size. Further, embodiments of the present invention advantageously provide the improved performance in a hardware-efficient manner (using two counters and a comparator).

Figure 5:
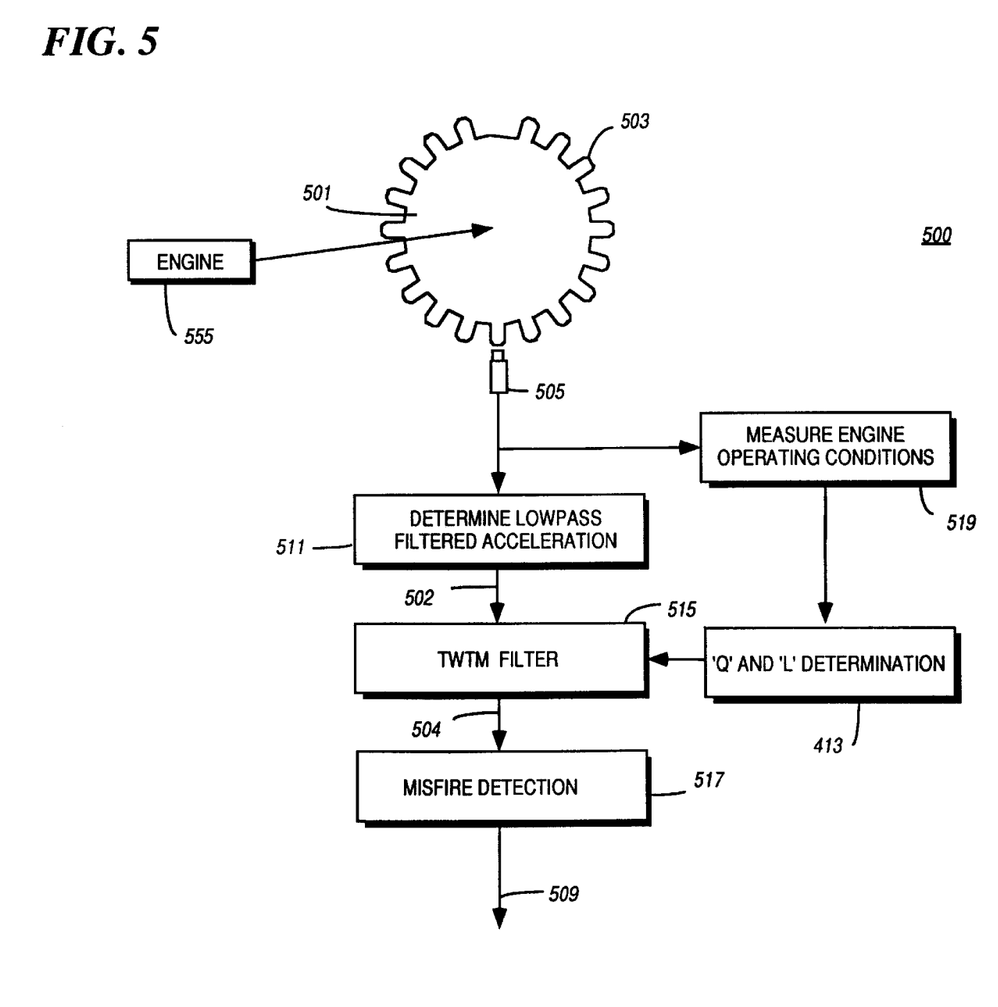
FIG. 5 is a system block diagram illustrating an alternative embodiment of a misfire detection system that uses the filter embodiments described herein.

In FIG. 5, a system block diagram illustrating an alternative embodiment of a misfire detection system 500. Note that there is some replication of structural elements introduced in FIG. 2. As with the embodiment described earlier, the system 500 is used to detect a misfiring condition using engine acceleration as a metric of combustion performance. Furthermore, it has the capability of significantly improving measured acceleration signal fidelity through a structure including a TWTM (time-weighted trimmed-mean) filter 515 that filters out adverse effects of, extraneous engine vibrations and driveline vibrations. Preferably, this filter 515 is a programmable digital filter programmed through apriori engine characterization and/or adaptively as the engine runs. A running engine 555 drives a wheel 501 having teeth, or positional markers 503 disposed radially on an edge of the wheel 501. The wheel 501 is coupled to a crankshaft of the engine 555 and rotates as a crankshaft coupled to the engine 555 rotates. An encoder, or position sensor, 505 is positioned across from the wheel 501 and is used to sense position of the teeth 503 as the wheel 501 rotates driven by the engine's combustion process. The misfire detection system 500 interprets an output of the encoder 505 and provides a signal 509 indicative of misfire behavior when it is detected. Note that other means of measuring the running engine's vibration can also be used. An accelerometer is a common way to do this.

Note that the system 500 is a sampled data system but could be implemented in a time-continuous domain if desirable. A first signal processing block 511 continuously determines an acceleration of the wheel 501 and provides an acceleration signal 502. In the present implementation continuous portions of this acceleration signal are used to form the set of L data elements in the queue described earlier. The first signal processing block 511 preferably includes a lowpass filter to filter out normal combustion energy associated with spectral behavior above the order of the misfiring data.

Another system block 513 determines the number Q (the number of data elements in the subset of the set of L data elements). Both Q and L can be predetermined or can be derived from engine characterization data and/or adaptively by measuring engine operating conditions as the engine runs. This measurement is shown in block 519. Block 519 can measure various engine operating condition such as engine speed, engine load, normal firing variability, engine coolant temperature etc. Preferably, both apriori-determined engine characterization data and adaptively measured engine data is used to determine L and Q.

The lowpass filtered acceleration signal 502 is then processed by the TMTM filter in system block 515 to in accordance with the determined L and Q to produce a filtered acceleration signal 504 substantially absent any energy associated with low frequency extraneous engine and driveline vibrations. As described earlier, the TWTM filter acts as a non-linear highpass filter.

The filtered acceleration signal 504 is then provided to a misfire detection block 517 and the earlier-described signal 509 is provided to indicate a misfire condition if it occurs. It is noted that the teachings in the present application can be combined with teachings in the earlier-identified reference entitled "MODIFIED TRIMMED MEAN FILTERING FOR MISFIRE DETECTION" to yield other embodiments of misfire detection systems.

An improved filtering method and apparatus have been described that is less silicon-complex, simpler to manufacture and thus more reliable than prior art schemes.

What is claimed is:

1. A method of filtering at least one set of data, the method comprising:

determining a subset of Q1 data elements of a first set of L1 data elements, wherein Q1 is at least two, wherein each of the subset of Q1 data elements is greater than at most a first predetermined number of the first set of L1 data elements and greater than or equal to at least a second predetermined number of the first set of L1 data elements other than itself;

determining a first filtered value for the first set of L1 data elements based upon the subset of Q1 data elements;

determining a subset of Q2 data elements of a second set of L2 data elements, wherein each of the subset of Q2 data elements is greater than at most a third predetermined number of the second set of L2 data elements and greater than or equal to at least a fourth predetermined number of the second set of L2 data elements other than itself;

determining a second filtered value for the second set of L2 data elements based upon the subset of Q2 data elements;

detecting a misfire condition based upon the first filtered value; and wherein L2 differs from L1.

2. A method of filtering at least one set of data, the method comprising:

determining a subset of Q1 data elements of a first set of L1 data elements, wherein Q1 is at least two wherein each of the subset of Q1 data elements is greater than at most a first predetermined number of the first set of L1 data elements and greater than or equal to at least a second predetermined number of the first set of L1 data elements other than itself;

determining a first filtered value for the first set of L1 data elements based upon the subset of Q1 data element;

determining a subset of Q2 data elements of a second set of L2 data elements, wherein each of the subset of Q2 data elements is greater than at most a third predetermined number of the second set of L2 data elements and greater than or equal to at least a fourth predetermined number of the second set of L2 data elements other than itself;

determining a second filtered value for the second set of L2 data elements based upon the subset of Q2 data elements;

detecting a misfire condition based upon the first filtered value; and wherein Q2 differs from Q1.

3. A method of filtering at least one set of data, the method comprising:

determining a subset of Q1 data elements of a first set of L1 data elements, wherein Q1 is at least two, wherein each of the subset of Q1 data elements is greater than at most a first predetermined number of the first set of L1 data elements and greater than or equal to at least a second predetermined number of the first set of L1 data elements other than itself;

determining a first filtered value for the first set of L1 data elements based upon the subset of Q1 data elements;

detecting a misfire condition based upon the first filtered value; and wherein determining the first filtered value comprises:

summing the subset of Q1 data elements to form a sum; and dividing the sum by Q1.

4. A method of filtering at least one set of data, the method comprising:

determining a subset of Q1 data elements of a first set of L1 data elements, wherein Q1 is at least two wherein each of the subset of Q1 data elements is greater than at most a first predetermined number of the first set of L1 data elements and greater than or equal to at least a second predetermined number of the first set of L1 data elements other than itself:;

determining a first filtered value for the first set of L1 data elements based upon the subset of Q1 data elements;

detecting a misfire condition based upon the first filtered value; and wherein the first predetermined number is one of (L1+Q1−2)/2 and (L1−Q1)/2.

5. A method of filtering at least one set of data, the method comprising:

determining a subset of Q1 data elements of a first set of L1 data elements, wherein Q1 is at least two, wherein each of the subset of Q1 data elements is greater than at most a first predetermined number of the first set of L1 data elements and greater than or equal to at least a second predetermined number of the first set of L1 data elements other than itself;

determining a first filtered value for the first set of L1 data elements based upon the subset of Q1 data elements;

detecting a misfire condition based upon the first filtered value; and wherein the subset of Q1 data elements include a first data element, and wherein determining the subset of Q1 data elements comprises:

determining a first number C1 of the first set of L1 data elements which are less than the first data element; and determining a second number C2 of the first set of L1 data elements, other than the first data element, which are less than or equal to the first data element.

6. A method in accordance with claim 5 wherein determining the subset of Q1 data elements further comprises:

determining that the first number C1 is less than a first threshold; and determining that the second number C2 is greater than or equal to a second threshold.

7. A method in accordance with claim 6 wherein the first threshold is (L1+Q1)/2, wherein the second threshold is (L1−Q1)/2.

8. A method in accordance with claim 5 wherein the first number C1 is determined using a first counter, and wherein the second number C2 is determined using a second counter.

9. A method in accordance with claim 8 wherein the subset of Q1 data elements include a second data element, wherein determining the subset of Q1 data elements comprises:

determining, using the first counter, a third number of the first set of L1 data elements which are less than the second data element; and determining, using the second counter, a fourth number of the first set of L1 data elements, other than the second data element, which are less than or equal to the second data element.

10. A method in accordance with claim 5 wherein the first set of L1 data elements represent acceleration data.

11. A method in accordance with claim 5 wherein the first set of L1 data elements are associated with an operating characteristic of a vehicle.

12. A method in accordance with claim 5 further comprising determining an engine acceleration at L1 points in time to form the first set of L1 data elements.

13. A method in accordance with claim 5 further comprising determining a difference quantity based upon the first filtered value.

14. A method in accordance with claim 13 wherein the difference quantity is a difference between a time-centered value of the L1 data elements and the first filtered value.

15. A method in accordance with claim 14 wherein the L1 data elements are time-ordered.

16. A method in accordance with claim 5 wherein more than Q1 data elements of the first set of L1 data elements satisfy criteria of being greater than at most a first predetermined number of the first set of L1 data elements and being greater than or equal to at least a second predetermined number of the first set of L1 data elements other than itself.

17. An apparatus comprising:
a filter to filter at least one set of data to determine a subset of Q1 data elements of a first set of L1 data elements and to determine a first filtered value for the first set of L1 data elements based upon the subset of Q1 data elements, wherein Q1 is at least two, wherein each of the subset of Q1 data elements is greater than at most a first predetermined number of the first set of L1 data elements and greater than or equal to at least a second predetermined number of the first set of L1 data elements other than itself;

the filter further to determine a subset of Q2 data elements of a second set of L2 data elements and to determine a second filtered value of the second set of L2 data elements based upon the subset of Q2 data elements, wherein each of the subset of Q2 data elements is greater than at most a third predetermined number of the second set of L2 data elements and greater than or equal to at least a fourth predetermined number of the second set of L2 data elements other than itself;

a detector to indicate when the first filtered value exceeds a threshold; and wherein Q2 differs from Q1.

18. An apparatus comprising:
a filter to filter at least one set of data to determine a subset of Q1 data elements of a first set of L1 data elements and to determine a first filtered value for the first set of L1 data elements based upon the subset of Q1 data elements wherein Q1 is at least two, wherein each of the subset of Q1 data elements is greater than at most a first predetermined number of the first set of L1 data elements and greater than or equal to at least a second predetermined number of the first set of L1 data elements other than itself;

the filter further to determine a subset of Q2 data elements of a second set of L2 data elements and to determine a second filtered value of the second set of L2 data elements based upon the subset of Q2 data elements, wherein each of the subset of Q2 data elements is greater than at most a third predetermined number of the second set of L2 data elements and greater than or equal to at least a fourth predetermined number of the second set of L2 data elements other than itself;

a detector to indicate when the first filtered value exceeds a threshold; and wherein L2 differs from L1.

19. An apparatus comprising:
a filter to filter at least one set of data to determine a subset of Q1 data elements of a first set of L1 data elements and to determine a first filtered value for the first set of L1 data elements based upon the subset of Q1 data elements wherein Q1 is at least two wherein each of the subset of Q1 data elements is greater than at most a first predetermined number of the first set of L1 data elements and greater than or equal to at least a second predetermined number of the first set of L1 data elements other than itself;

a detector to indicate when the first filtered value exceeds a threshold; and wherein the filter determines the first filtered value by summing the subset of Q1 data elements to form a sum and dividing the sum by Q1.

20. An apparatus comprising:
a filter to filter at least one set of data to determine a subset of Q1 data elements of a first set of L1 data elements and to determine a first filtered value for the first set of L1 data elements based upon the subset of Q1 data elements, wherein Q1 is at least two, wherein each of the subset of Q1 data elements is greater than at most a first predetermined number of the first set of L1 data elements and greater than or equal to at least a second predetermined number of the first set of L1 data elements other than itself;

a detector to indicate when the first filtered value exceeds a threshold; and wherein the first predetermined number is one of $(L1+Q1-2)/2$ and $(L1-Q)/2$.

21. An apparatus comprising:
filter to filter at least one set of data to determine a subset of Q1 data elements of a first set of L1 data elements and to determine a first filtered value for the first set of L1 data elements based upon the subset of Q1 data elements wherein Q1 is at least two wherein each of the subset of Q1 data elements is greater than at most a first predetermined number of the first set of L1 data elements and greater than or equal to at least a second predetermined number of the first set of L1 data elements other than itself;

a detector to indicate when the first filtered value exceeds a threshold; and wherein the subset of Q1 data elements include a first data element, wherein the filter determines the subset of Q1 data elements by determining a first number C1 of the first set of L1 data elements which are less than the first data element, and by determining a second number C2 of the first set of L1 data elements, other than the first data element, which are less than or equal to the first data element.

22. An apparatus in accordance with claim 21 wherein the filter determines the subset of Q1 data elements by determining that the first number C1 is less than a first threshold, and by determining that the second number C2 is greater than or equal to a second threshold.

23. An apparatus in accordance with claim 22 wherein the first threshold is $(L1+Q1)/2$, wherein the second threshold is $(L1-Q1)/2$.

24. An apparatus in accordance with claim 21 wherein the filter includes a first counter and a second counter, wherein the first number C1 is determined using the first counter, and wherein the second number C2 is determined using the second counter.

25. An apparatus in accordance with claim 24 wherein the subset of Q1 data elements include a second data element, wherein the filter determines the subset of Q1 data elements by determining, using the first counter, a third number of the first set of L1 data elements which are less than the second data element, and by determining, using the second counter, a fourth number of the first set of L1 data elements, other than the second data element, which are less than or equal to the second data element.

26. An apparatus in accordance with claim 21 wherein the first set of L1 data elements represent acceleration data.

27. An apparatus in accordance with claim 21 wherein the first set of L1 data elements are associated with an operating characteristic of a vehicle.

28. An apparatus in accordance with claim 21 further comprising a sensor to assist in determining an engine acceleration at L1 points in time to form the first set of L1 data elements, wherein the filter is responsive to the sensor.

29. An apparatus in accordance with claim 21 wherein the detector is a misfire detector.

30. An apparatus in accordance with claim 21 wherein the filter determines a difference quantity based upon the first filtered value.

31. An apparatus in accordance with claim 30 wherein the difference quantity is a difference between a time-centered value of the L1 data elements and the first filtered value.

32. An apparatus in accordance with claim 31 wherein the L1 data elements are time-ordered.

33. An apparatus in accordance with claim 21 wherein more than Q1 data elements of the first set of L1 data elements satisfy criteria of being greater than at most a first predetermined number of the first set of L1 data elements and being greater than or equal to at least a second predetermined number of the first set of L1 data elements other than itself.

34. A method of determining misfire comprising:

acquiring a set of L acceleration data elements from a running engine;

determining a Subset of Q data elements from the set of L acceleration data samples, wherein Q is at least two, and each member of the subset of Q data elements has a singed magnitude greater than at most a first predetermined number of the set of L data elements and greater than or equal to at least a second predetermined number of the set of L data elements other than the each member of the subset;

determining a filtered value for the set of L data elements based upon an average of the data elements of the subset of Q data elements;

providing a misfire indication when a difference between a time centered value of the set of L acceleration data samples and the filtered value exceed a threshold; and wherein the first predetermined number is one of $(L1+Q1-2)/2$ and $(L1-Q1)/2$.

* * * * *